United States Patent [19]
Bennett

[11] 3,747,488
[45] July 24, 1973

[54] PHOTOGRAPHIC MOTION PICTURE APPARATUS

[75] Inventor: Stewart Bennett, Concord, Mass.

[73] Assignee: Polaroid Corporation, Cambridge, Mass.

[22] Filed: May 20, 1971

[21] Appl. No.: 145,267

[52] U.S. Cl. .................... 95/11 L, 240/2 C, 240/36
[51] Int. Cl. ........................................... G03b 17/56
[58] Field of Search ...................... 240/1.3, 2 C, 36, 240/81 C, 92; 95/11 R, 11 L; 353/102

[56] References Cited
UNITED STATES PATENTS

| | | | |
|---|---|---|---|
| 2,798,943 | 7/1957 | Prideaux | 240/47 |
| 3,113,495 | 12/1963 | Brandt et al. | 240/1.3 X |
| 3,172,345 | 3/1965 | Jakob et al. | 95/11 L |
| 3,208,363 | 9/1965 | Easterly et al. | 95/11 R |
| 3,296,923 | 1/1967 | Miles | 353/102 X |
| 3,479,117 | 11/1969 | Tronnier et al. | 353/102 |
| 3,603,781 | 9/1971 | Kobayashi et al. | 240/1.3 |

FOREIGN PATENTS OR APPLICATIONS

| | | | |
|---|---|---|---|
| 1,208,960 | 10/1970 | Great Britain | 240/1.3 |

*Primary Examiner*—Fred L. Braun
*Attorney*—Brown & Mikulka, Robert L. Berger and David R. Thornton

[57] ABSTRACT

A movie light, adapted for mounting on a motion picture camera, employing a crossed-lenticular lens for providing uniform illumination over a precisely controlled solid angle conforming to the maximum viewing angle of the camera, for providing efficient illumination of a scene during exposure operations and for providing a source of apparently low brightness to an observer located within the illuminated scene. The lighting unit includes a platform-like base which is adapted to receive an integrally combined high intensity source and dichroic reflector which directs a major portion of the visible radiation in a given direction for transmission through the lens element while laterally dispersing a major portion of the infrared radiation. An inclined mirror positioned over the source redirects the visible light from its given path to a lens system which consists of a Fresnel lens and a crossed-lenticulated screen. A lug member depending from the lower surface of the base is configured for attachment to the camera for orientation of the lighting unit such that its solid angle of illumination intercepts the viewing angle of the camera within the scene which is to be photographically recorded.

12 Claims, 5 Drawing Figures

INVENTOR.
STEWART BENNETT

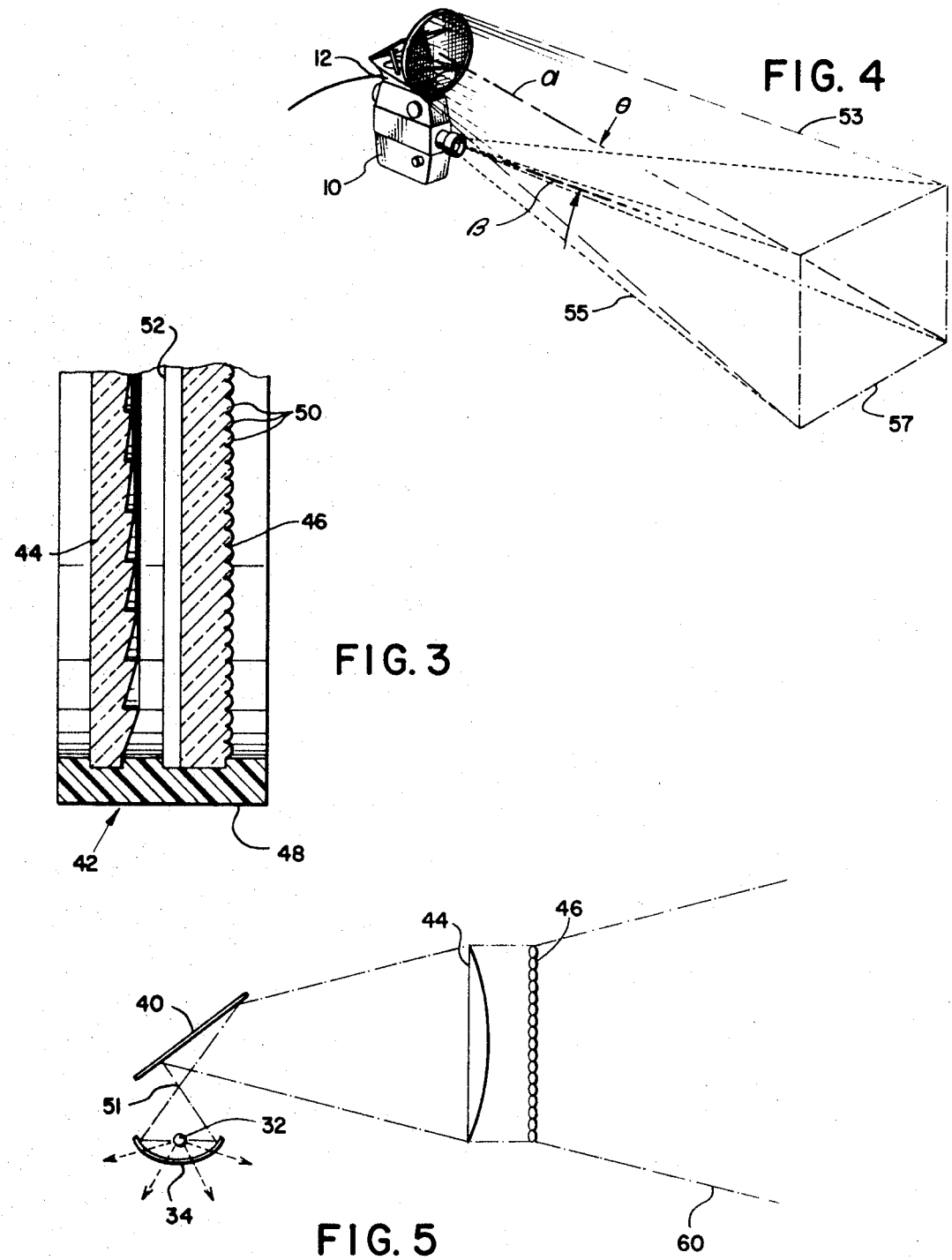

//3,747,488

PHOTOGRAPHIC MOTION PICTURE APPARATUS

BACKGROUND OF THE INVENTION

1. Field of the Invention

This invention relates to photographic motion picture apparatus and more particularly to photographic motion picture apparatus employing a highly efficient illuminating unit in cooperation with a motion picture camera for illuminating the scene within the camera field of view during exposure operations and a method of doing the same.

2. Description of the Prior Art

In the photographic arts, it is often necessary to employ artificial light for proper illumination of the subject during exposure operations. Conventionally, an excessively large area is illuminated with one or more high intensity lighting units to provide minimum illumination of acceptable uniformity throughout the area of interest. This arrangement not only inefficiently illuminates areas outside the area of interest and reduces photographic quality due to the non-uniformity of lighting but also exposes the subject to a light source of such unnecessarily high brightness as to cause ophthamic discomfort. For motion picture photography, with which the invention is particularly concerned, the continuous illumination during exposure operations makes consideration of these factors of primary importance. Moreover, the incandescent sources conventionally employed in motion picture photography often direct a considerable amount of infrared energy toward the scene which not only adds to the discomfort of the subject but is, in many cases, of succifiently high energy to actually ignite inflammable materials present in the scene.

In commercial motion picture photography several spot and flood lights, placed at considerable distance from the subject and the photographer and arranged in accordance with the skill of the latter, are employed to produce suitable, uniform illumination of the scene. Hence, the hazardous and discomforting effects of the lighting units are alleviated to some degree, and the overall lighting efficiency is of reduced importance. However, these arrangements are not suitable for portable motion picture systems, as for example, hand-held units employed in amateur motion picture photography, etc. In the latter case, it is important to provide a fully portable apparatus including a lighting unit capable of sufficiently illuminating the scene during exposure operations with a minimum of hazard and discomfort to the subject.

Consequently, it is an important object of this invention to provide an improved motion picture photographic system including a lighting unit adapted to efficiently illuminate the scene of interest.

Another primary object of this invention is to provide an improved lighting unit for use with a motion picture camera for facilitating illumination of the scene during exposure operations while producing a minimum of discomfort to the subject.

An additional object of this invention is to provide an improved lighting unit adapted for mounting on a motion picture camera for facilitating safe, efficient illumination of the scene during exposure operations.

Another object of this invention is to provide a portable lighting unit for use with a camera for producing and directing visible radiation of low apparent brightness uniformly over the area of interest while excluding projection of thermal radiation thereto.

A still further object is to provide a method for efficiently and safely illuminating a scene for recording of images thereof on photosensitive material.

SUMMARY OF THE INVENTION

The present invention provides photographic apparatus for use with a motion picture camera having a given maximum viewing angle for illumination of a scene during exposure operations to record latent images thereof on photosensitive material carried within the camera. The apparatus includes means for mounting a source of illumination and means for uniformly directing illumination from the source over a solid angle approximately conforming to the maximum viewing angle of such camera. In the preferred embodiment, a lenticular lens or screen is employed in cooperation with a high intensity source to uniformly distribute light over the precise area within the field of view of the camera and simultaneously provide a source of apparently low brightness to an observer located within the scene.

The lighting unit is configured for mounting an integrally combined incandescent source and dichroic element which directs the visible and infrared radiation of the source along different paths so as to minimize the infrared radiation directed toward said scene. The dichroic element is a curved reflector which focuses a major portion of the visible light at a crossover point spaced in a given direction from the source while it transmits a major portion of the infrared radiation in other directions. A positive Fresnel lens, disposed between the crossover point and the lenticular lens, is employed to collimate the visible radiation diverging from the crossover point and transmit it along the optical axis of the lenticular screen for uniform dispersion thereby over a precisely controlled angle conforming to the maximum viewing angle of the camera.

Preferably, the lighting unit is provided in a compact structure comprising a platform-like support member which includes an electrical socket and conduit means adapted to receive an integrally combined high intensity lamp and dichroic reflector unit which reflects visible radiation of the source normal to the platform while transmitting thermal radiation in other directions. A second reflector is inclined over the high intensity unit and configured to redirect the visible rays substantially parallel to the platform and along the optical axis of a Fresnel-lenticulated lens assembly which is located in a vertical position at the forward edge of the platform.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein;

FIG. 3 is a fragmentary sectional view of the lens assembly taken along the lines 3—3 of FIG. 1;

FIG. 4 is a diagrammatic view in perspective illustrating operation of the motion picture camera system illustrated in FIG. 1; and FIG. 5 is a schematic diagram illustrating the optical arrangement of the illuminating unit of FIG. 1.

DESCRIPTION OF THE PREFERRED EMBODIMENTS

Figure 1:
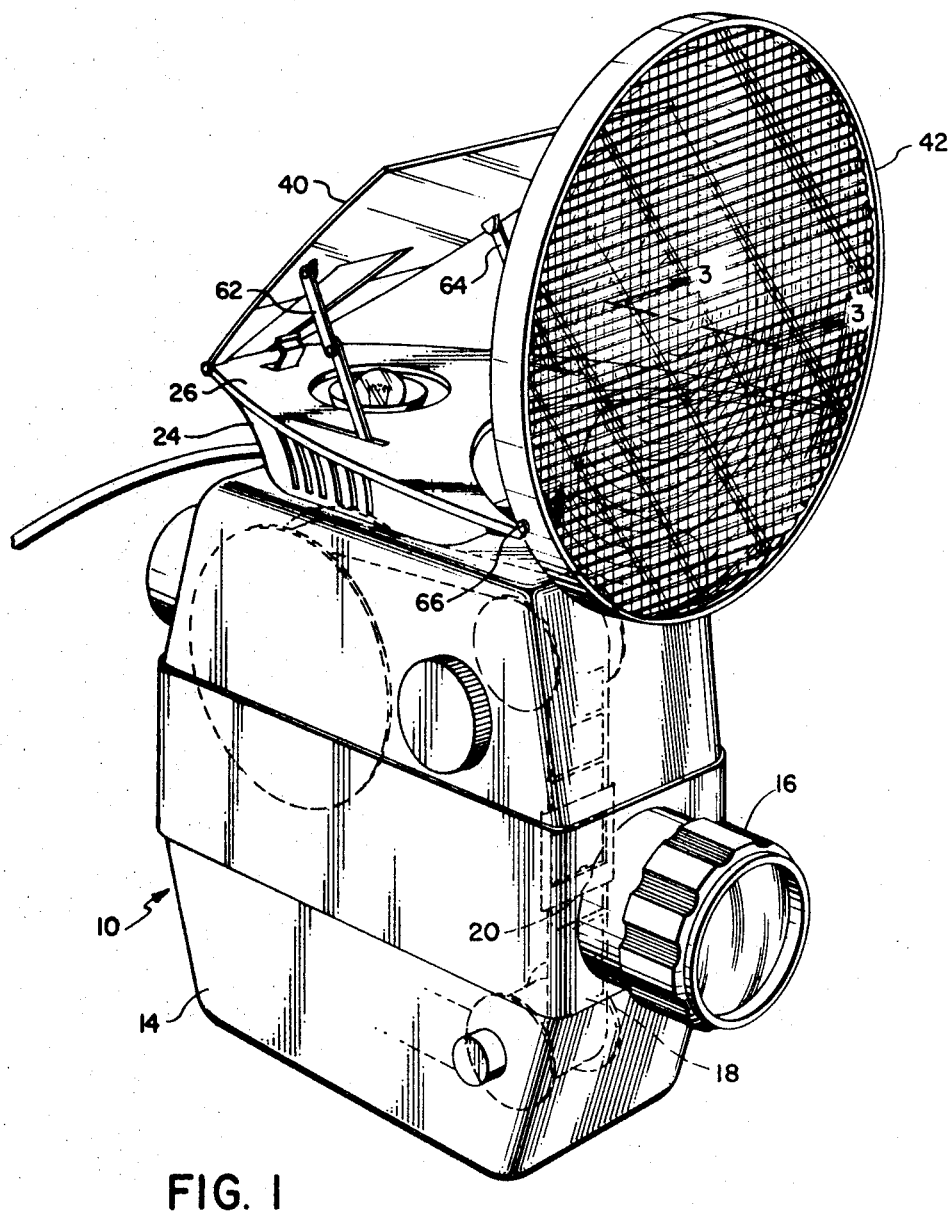
FIG. 1 is a diagrammatic view in perspective of a motion picture camera system employing a lighting unit embodying features of this invention.
Figure 2:
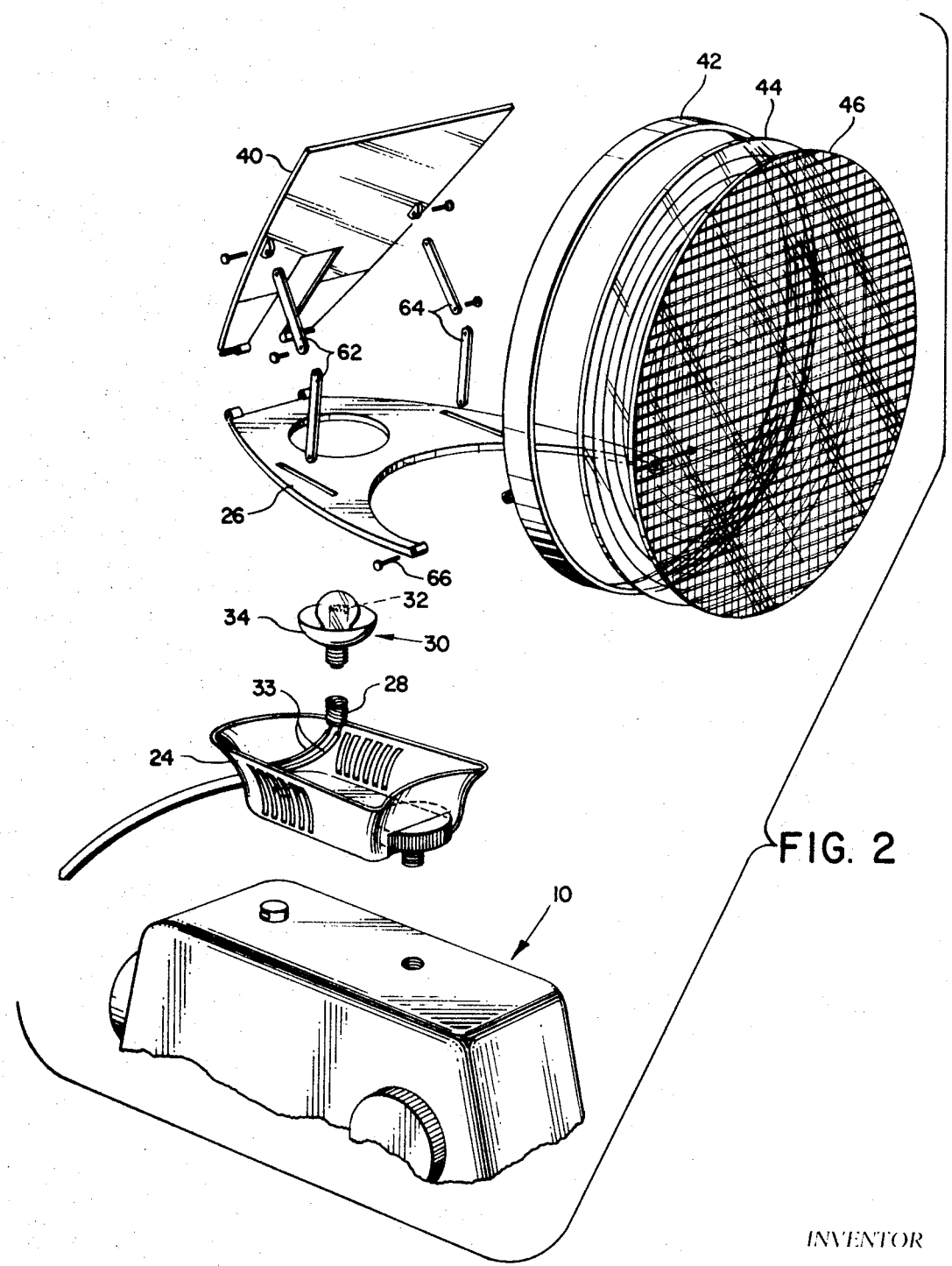
FIG. 2 is an exploded view in perspective of the lighting unit shown in FIG. 1.

FIGS. 1 and 2, a conventional motion picture camera 10 is shown in association with a lighting unit 12. The camera 10 comprises a substantially light-tight housing 14 having a forwardly positioned objective lens system 16 adapted for exposure of motion picture film 18 when it is positioned within the housing in an exposure plane adjoining aperture 20. As shown in detail in FIG. 2, the lighting unit 12 comprises a hollow base 24 having an upper platform-like surface 26. An electrical socket or receptacle 28 is disposed within the base 24 and adapted for mounting of a high intensity illuminating means 30 and for energizing the same by connection through leads 33 to a conventional source (not shown) of electrical power.

In the preferred embodiment, the illuminating means 30 includes a source of illumination and dichroic reflector 34 supplied as an integral unit, for example, a Tungsten Halogen source surrounded to a major extent by an elliptical dichroic reflector element which focuses the visible radiation a short distance forward of the source while it transmits a major portion of the infrared radiation. Hence, a lamp similar to the DNF Halogen lamp 150 QTB/LVD marketed by the Photolamp Products Division, Sylvania Electric Products, Incorporated of Salem Massachusetts will be suitable. Alternately, the illumination system may take the form of more traditional types such as those wherein the focal point of the reflector is at the lamp itself and a lens positioned in front of the lamp focuses a converging beam of light to a particular focal point. The lighting unit 12 and its lamp socket 28 are arranged such that a major portion of the visible radiation from the source 32 is directed upwardly to a mirror element 40 which redirects the light energy through a vertically positioned lens assembly 42.

As shown in detail in FIG. 3, lens assembly 42 includes a pair of lens elements 44 and 46, mounted within a support member 48 and respectively providing means for collimating the illumination from the source 30 and for uniformly dispersing the illumination over a solid angle. Herein, lens element 44 is a positive lens, for example, a circular Fresnel or echelon lens which is adapted to collimate radiation from source 32 and direct it in substantially parallel rays through the forwardly positioned lenticular element 46. The lenticular lens or screen-like element 46 is a crossed-lenticular lens having a plurality or parallel rib-like lenticules 50 and 52 disposed in crossed relation on the front and rear screen surfaces respectively. Hence, the lenticules of one face are orthogonal to the lenticules of the other face such that each set of lenticules provides controlled uniform dispersion of the transmitted radiation in respective orthogonal planes.

The longitudinal axes of forward lenticules 50 lie in horizontal planes while the axes of the rear lenticules 52 are disposed in vertical planes so that, together, they disperse the transmitted light over a solid angle whose sides form horizontal and vertical planes. Stated otherwise, each crossed portion of the lenticules substantially function as individual lens elements which disperse the light over the indicated solid angle of illumination. Hence, the lens 46 also provides a lenticular array of large area which presents a mosaic of light sources to the subject and thereby provides means for presenting a collective source of apparently low brightness.

Preferably, the lenticular screen 46 is designed to transmit a solid angle of illumination substantially conforming to the camera viewing angle which is, in turn, determined by its lens system 16 in combination with exposure aperture 20. In this embodiment, lens system 16 is a conventional lens system of variable focus, and screen 46 is configured to provide an angle of illumination conforming to the widest or maximum viewing angle of the camera which is, in turn, determined by the minimum focal length of the camera lens system. Since one of the purposes of the novel lighting unit is to provide maximum efficiency of illumination, the solid angle of illumination should preferably, substantially conform to, or that is, be on the order of and not less than the maximum viewing angle. For instance, with a camera having a wide viewing angle of 14° by 18°, the solid angle of illumination should preferably be within 14° to 14½° by 18° to 18½°. Preferably, the lenticular lens 46 is oriented with respect to the camera 10 such that the rectangular cross-section of the angle of illumination and that of the viewing angle of the camera have a corresponding attitude. Hence, when the lighting unit 12 is mounted to the camera, for example, by a conventional lug member 54, so as to direct the optical axis α of the solid angle 53 of illumination along the direction of and converging at a slight angle θ to the converging axis β of the viewing angle 55, as shown in FIG. 4, for interception with the latter, the lighting unit will illuminate a rectangular area 57 which is substantially congruant to the scene area viewed by the camera. For proper illumination, the angle of inclination θ of the lighting unit or that is, the angle between the lamp projection axis α and the lens axis β is determined in accordance with the object distance of the camera system so as to provide interception at this distance. For example, in a typical case where the axis of the screen is spaced approximately 5 inches above the camera lens and the average object distance is 7 feet, θ would be in the order of 3½°.

In contrast to conventional, portable movie lights, which generally emit a non-uniform cone-shaped or elliptical pattern of radiation which greatly exceeds the viewing angle of the camera, the transmission of a precise solid angle of illumination in conjunction with the substantial uniformity of intensity across the solid angle provides highly efficient illumination of the subject. It should be understood, of course, that since the lighting unit is designed to illuminate an area conforming to the widest scene area which may be viewed by the camera, some loss of efficiency will result during the interval within which the camera is employed to record scenes of smaller area, i.e., at longer focal distance settings. Additionally, if the screen 46 is configured to illuminate areas greater than the recorded scene area a further loss in overall efficiency will result. However, in either case, the efficiency will still generally exceed those of the prior art and the lighting unit will, of course, still retain its other advantages such as the uniformity of illumination and the presentation to the subject of a source of apparently low brightness, etc.

Advantageously, while a typical amateur movie light of 650 watts input produces approximately 300 lumens per sq. cm. of visible radiation (and additional hazardous amounts of infrared) at its exit aperture, the present structure employing a lenticulated screen of 7 inch diameter and utilizing a 200 watt bulb will emit approximately 20 lumens per sq. cm. of solely visible radiation at the screen exterior. Advantageously, the screen 46 is of large diameter relative to the lamp 30 and in accordance with its lenticulated form provides a multiplicity of source images of substantially equal apparent brightness to the observer. Hence, while a small diameter lamp (e.g. of 1 inch reflector diameter) is employed, which provides a relatively compact structure, the large area (e.g. approximately 50 square inches) lenticular screen presents a source of apparently low brightness to the subject. Additionally, if the lenticules are chosen fine enough (e.g. over 50 per inch and preferably 100 per inch) such that they cannot be resolved by the subject at a suitable distance, such as a few feet from the screen, the source images are unresolved and the screen presents a diffused source of apparently low brightness while still maintaining the precise solid angle of illumination.

Brightness is, of course, related to the sensory perception of light and standing alone, is somewhat non-quantitative, however, it generally can be considered as a function of the visible light flux per unit area, per unit angle. In any case, for a given observer located at a given point relative to a source which produces given lumens per radian, it can be seen that the apparent brightness will be related to the source area. Stated otherwise, the comparative brightness of two sources directing the same amount of light energy over equal solid angles will be substantially equal to the ratio of their areas.

Consequently, while a high intensity bulb of the aforementioned type, when viewed directly, provides an effective source area of approximately 0.8 square inch (approximate area of the 1 inch reflector opening) the 7 inch screen has an area of approximately 50 square inches. Hence, in the given example, the lighting unit provides a ratio of the area of the perceived source to the area of the effective source in the order of 60:1 and results in a reduction in apparent brightness of approximately the same magnitude. Stated otherwise, the area of the perceived source is approximately 60 times the area of the open end of the reflector. Ratios greater than 10:1 are preferred, however, it should be evident that while the apparent brightness perceived by the subject will be higher for units of small screen area, in accordance with the reduction in the ratio of screen to source area, the screen presents a uniformly illuminated area to the observer, and hence, the apparent brightness of the novel unit will in all cases be significantly lower than prior art units having the same size exit aperture which typically present to the subject a "hot spot," representative of the small area of the actual source of illumination.

Typically, the screen 46 is constructed of plexiglass and includes 100 lenticules per inch having a circular-cylindrical contour. The specific radius of the lenticules is dependent upon the desired angle of illumination and may be determined from the following:

$$r = 1/2N\tan\phi\,(n-1)$$

where
$r$ = radius of the lens or lenticule
$n$ = index of refraction
$N$ = number of lenticules per inch
$\phi$ = half angle of the camera viewing angle in the plane of the lenticule curvature.

For compactness, a folded light path is employed in this embodiment. Hence, the visible radiation emitted by source 32 is deflected through 90 degrees by reflector 40, as shown in FIG. 5. Specifically, the source 32 is positioned at one foci of the ellipsoidal shaped dichroic reflector 34 which, while transmitting infrared radiation, focuses or causes the visible radiation to converge and crossover at the other foci as shown at 51. The Fresnel lens 44 is of a particular design having a given focal length and is preferably positioned with respect to mirror 40 and crossover 51 so that the optical path from crossover 51 to lens 44 is in the order of or equal to its focal length. Hence, the diverging light pattern from crossover 51 is collimated into substantially parallel rays directed along the optical axis of the lenticular screen 46 which in turn disperses the illumination over a solid angle, as shown in a plan side view at 60 in this figure.

Preferably, the lighting unit is constructed in a folding arrangement as described in Copending U.S. Pat. application Ser. No. 145,268 of Philip G. Baker filed May 20, 1971, entitled "Photographic Lighting Unit" and assigned to the same assignee as the present invention. Hence, mirror 40 and lens assembly 42 are pivotally mounted on the platform 26 for erection from a compact storage position overlying the platform to an operating position about the platform. In this case, mirror 40 is coupled to platform 26 by struts or lever members 62 and 64 which permit its displacement from a flat storage position to an inclined position while lens assembly 44 is pivotally mounted to the platform as at 66 for displacement between a vertical, operative position and one overlying the source and mirror.

Although the relative size of the lighting unit of the invention is determined to some extent by the large area screen, desired for low apparent brightness, the preferred arrangement advantageously employs a substantially planar collimating lens and screen located in close proximity to each other and thereby provides improved form-factor and compactness of a lighting unit having a relatively large exit aperture. Of course, many different arrangements are possible, for example, the redirecting means or planar mirror 40 could be dichroic so as to provide a heat dispersing means, and obviously could also be eliminated where a larger unit without a folded light path is desired.

Those familiar with the motion picture arts will readily appreciate the novel and highly unique advantages of this invention. A safe, efficient lighting unit is provided which is capable of effectively illuminating the scene to be photographed and is particularly adapted for mounting on a motion picture camera. Advantageously, the invention provides a relatively compact, highly efficient lighting unit providing uniform, substantial heat free illumination of the scene of interest while presenting a source of apparently low brightness to the subject. The unit efficiency permits safe operation in close proximity to the photographer with minimum discomfort thereto, whereas the uniformity of illumination produces higher quality pictures, more pleasing to the picture viewing audience. Moreover, in addition to the low power input of the unit, the dispersing of thermal energy exterior to the projected beam significantly reduces or eliminates fire hazards while it also minimizes the discomfort of the illuminated subject. Importantly, the ophthalmic discomfort of the subject is also eliminated or significantly reduced by the low apparent brightness of the exit screen.

Inasmuch as this invention may be practiced or embodied in still other ways without departing from the spirit and essential character thereof, it is to be understood that the preferred embodiment described herein is illustrative and not restrictive, the scope of the invention being indicated by the appended claims and all variations which come within the meaning of the claims are intended to be embraced therein.

What is claimed is:

1. An accessory for selective mounting upon and use with a motion picture camera having a given maximum viewing angle and object distance and intended for selective use with artificial illumination, for substantially continuously illuminating a scene during exposure operation to record images of such scene on photosensitive material carried within such camera, said accessory comprising:

a support member including first means for receiving a source of illumination of the type which emits both visible and infrared radiation and includes dischroic reflector means partially enclosing such source and configured for directing at least a major portion of such visible radiation in a given direction forwardly of such source along a first path and a major portion of such infrared radiation generally rearwardly of such source;

second means mounted on said support member for redirecting such illumination directed along said first path along a second path substantially normal thereto;

third means mounted on said support member for uniformly directing such illumination passing along said second path over a solid angle approximately the same as such viewing angle and for providing a substantially uniform apparent source of large area and low apparent brightness as compared to such source; and fourth means for releasably mounting said support member on such camera such that the axis of said solid angle intercepts the axis of such viewing angle at such object distance and said first path is generally normal to the axis of such viewing angle such that the visible radiation from such source is first directed generally laterally outwardly from such camera along said first path and such infrared radiation is directed generally towards such camera and away from such scene and the operator of such camera.

2. The apparatus of claim 1 wherein such dichroic means is a curved dichroic reflector configured for partially surrounding such source and for directing such visible radiation forwardly of such reflector and for permitting such infrared radiation to pass rearwardly of such reflector, said receiving means is configured for mounting such source and such reflector such that said visible radiation is directed along said first path outwardly of and approximately normal to said support member while said infrared radiation is directed rearwardly towards said support member, said second means includes a reflector element configured for redirecting the visible radiation of said first path along said second path in substantially parallel relation to said support member, and said fourth means includes means for mounting said support member on a side surface of such camera such that said second path is configured to intercept the axis of such viewing angle at such object distance.

3. An accessory for selective mounting upon and use with a motion picture camera having a given maximum viewing angle and object distance and intended for selective use with artificial illumination for substantially continuously illuminating a scene during exposure operations to record images of such scene on photosensitive material carried within such camera, said accessory comprising:

first means for receiving a source of high intensity illumination and a reflector having an open end of given area, such reflector partially surrounding such source and configured for directing illumination thereof through such open end and in a subsequently diverging pattern such that the area of such open end defines a predetermined effective area of such source;

second means for substantially uniformly directing illumination from such source over a solid angle substantially the same as such maximum viewing angle and for providing a substantially uniform apparent source of comparatively large area and of low brightness relative to such source when viewed by an observer located in such scene, said second means including a collimating lens and a lenticular screen both of which are of large area as compared to such given area of such open end of such reflector, said collimating lens being coaxially aligned with said lenticular screen and arranged between said first means and said lenticular screen so as to intercept substantially all of the illumination in said diverging pattern and to direct such illumination in a collimated arrangement to said screen and in conjunction with said lenticular screen to uniformly direct such illumination over said solid angle and present to an observer in such scene a large array of substantially equally bright images of the effective area of such source and low intensity as compared to such source so as to thereby collectively provide a relatively large area apparent source of relatively low brightness; and third means for mounting said first and said second means on such camera so as to orient said solid angle for approximate interception of its axis with the axis of such maximum viewing angle at such object distance.

4. The accessory of claim 3 wherein such reflector is configured for cooperating with such source to focus the illumination thereof to a given crossover point forwardly of said source and thereafter in said diverging pattern, and said collimating lens is a positive lens having a given focal length, said positive lens being spaced forwardly of such crossover point a distance approximately equal to its said focal distance and relatively closely spaced to said lenticular screen.

5. The accessory of claim 3 wherein said first means is arranged in relation to said second means such that illumination from such source is directed by such reflector along a first path at an angle to the axis of said collimating lens, and said accessory additionally includes a second reflector element configured to redirect the illumination passing along said first path along a second path coaxial with the axes of said collimating lens and said lenticular screen.

6. The apparatus of claim 3 wherein the area of both said collimating lens and said lenticular screen is at least 10 times such given area of the open end of such reflector.

7. The apparatus of claim 3 wherein said area of said lens and said screen is at least 60 times such given area of the open end of such reflector.

8. The accessory of claim 7 wherein said collimating means is a Fresnel lens and said lenticular screen includes more than 50 lenticules per inch.

9. A motion picture camera system for substantially continuously illuminating a scene during exposure operations for recording images of such scene on photosensitive material, said system comprising:
a substantially light tight housing;
means disposed within said housing for supporting such photosensitive material at an exposure plane;
means on said housing for mounting an objective lens for forming an image at said exposure plane of a field of view of predetermined maximum angular extent;
first means for mounting a source of high intensity illumination and a reflector having an open end of given area, such reflector partially surrounding such source and configured for directing illumination thereof through such open end and in a subsequently diverging pattern such that the area of such open end defines a predetermined effective area of such source; and
second means on said housing for substantially uniformly directing illumination from said source over a solid angle conforming to such maximum extent of such field of view and for providing a substantially uniform apparent source of low brightness when viewed by an observer located in such scene, said second means including a collimating lens and a lenticular screen both of large area as compared to said given area of such open end of such reflector, said collimating lens being coaxially aligned with said lenticular screen and arranged between said means for mounting said source and said lenticular screen so as to intercept substantially all of the illumination in said diverging pattern and to direct it in a collimated arrangement to said lenticular screen and in conjunction with said lenticular screen to uniformly direct such illumination over said solid angle and present to an observer in such scene a large array of substantially equally bright images of the effective area of such source and low intensity as compared to such source so as to thereby collectively provide a large area apparent source of relatively low brightness.

10. The system of claim 9 wherein said means for mounting said source is arranged in relation to said collimating lens and said lenticular screen such that such illumination of such source is directed by such reflector along a first path at an angle to the axis of said collimating lens and said system additionally includes a second reflector element mounted on said housing for redirecting the illumination passing along said first path along a second path coaxial with the axes of said collimating lens and said lenticular screen.

11. The system of claim 9 wherein the area of both said collimating lens and said lenticular screen is at least 10 times such given area of the open end of such reflector.

12. The system of claim 9 wherein the area of both said collimating lens and said lenticular screen is at least 60 times such given area of the open end of such reflector.

* * * * *